United States Patent
Brown

[15] 3,676,308
[45] July 11, 1972

[54] ELECTROLYTIC CODEPOSITION OF POLYVINYLIDENE AND COPOLYMER PARTICLES WITH COPPER

[72] Inventor: Henry Brown, Huntington Woods, Mich.
[73] Assignee: Udylite Corporation, Warren, Mich.
[22] Filed: June 19, 1969
[21] Appl. No.: 834,892

[52] U.S. Cl. ...............................204/16, 204/16, 204/52 R, 204/181
[51] Int. Cl. .........................................C23b 5/48, C23b 5/20
[58] Field of Search .......................204/181, 38 CE, 16, 52 R

[56] References Cited

UNITED STATES PATENTS

| | | | |
|---|---|---|---|
| 3,434,942 | 3/1969 | Waterman | 204/181 |
| 2,800,447 | 7/1957 | Graham | 204/181 |
| 2,530,366 | 11/1950 | Gray | 204/181 |
| 3,403,089 | 9/1968 | Joyce | 204/181 |
| 1,702,927 | 2/1929 | Bezzenberger | 204/181 |

OTHER PUBLICATIONS

Kirk–Othmer Encyclopedia of Chemical Technology, Vol. 8, 1965, pp. 30–32
Transactions of the Electrochem. Soc., Fink et al., 54 1928, pp. 315–320

*Primary Examiner*—John H. Mack
*Assistant Examiner*—R. L. Andrews
*Attorney*—Stanley H. Lieberstein and William J. Schramm

[57] ABSTRACT

Fine particles of organic resins derived from vinylidene chloride such as Saran F–220 resin, a copolymer of vinylidene chloride and acrylonitrile, densely codeposit with copper when dispersed in aqueous acidic copper electroplating baths. These fine particles of polyvinylidene resins codeposit on vertical cathodes to an amazingly high volume percent compared to any other bath-insoluble particles, inorganic or organic. The surfaces of such two-phase copper coatings with their densely imbedded resin particles have anti-seizing properties. Furthermore, when subsequent thin plate is deposited over these copper surfaces with their densely imbedded particles, a finely porous over-lay plate is obtained. Also the resin particles may be dissolved out with solvents to yield porous copper surfaces or porous films.

12 Claims, No Drawings

ELECTROLYTIC CODEPOSITION OF POLYVINYLIDENE AND COPOLYMER PARTICLES WITH COPPER

This invention relates to the codeposition of dispersed fine particles of organic resins, derived from vinylidene chloride, with copper from acid copper electroplating baths. More particularly it relates to the codeposition with copper of Saran resin powders such as Saran F–220 resin (Dow) (a vinylidene chloride copolymer with acrylonitrile) when the fine resin powder is dispersed in the acid copper plating bath. In general this invention relates to the codeposition with copper from acid copper electroplating baths of resin particles which are polymers of vinylidene chloride or copolymers of vinylidene chloride with up to about 30 percent of other unsaturated organic compounds such as acrylonitrile, acrylic, maleic, fumaric or itaconic acid esters, etc.

In a study of the codeposition of organic resin particles dispersed in acid copper sulfate plating baths, it was found that the Saran resin powders such as Saran F–220 were unique in that the particles densely codeposited on vertical cathodes with the copper plate, whereas other organic resin powders such as Nylon, PVC, Teflon, polyethylene and many other resin powders did not codeposit on vertical surfaces from the same plain, acid copper sulfate plating baths, nor did inorganic, non-conducting, fine particles of barium sulfate, aluminum oxide, silicon carbide, etc. codeposit with the copper.

The Saran powder was found to codeposit on vertical surfaces with a very surprisingly high volume percent in the copper matrix, at least as high as in a nickel bath, and these volume percents are higher than with any other organic resin powder studied in any plating bath, and for that matter, greater than any insoluble, non-conducting, inorganic powder studied. The volume percent codeposited on vertical surfaces was consistently around 25 to 30 percent. Furthermore, it is possible to codeposit high percentages of the larger particle sizes of 20 to 50 microns size particles in even 0.3 to 0.5 mil copper plate along with agglomerated smaller particles giving copper surfaces with a very dense population of imbedded particles. This makes possible a very high porosity in any subsequent plate such as a thin nickel plate of 0.01 to 0.5 mil deposited upon such a copper surface with its dense population of non-conducting particles. This porous nickel plate can be chromium plated with a plate of up to at least 0.1 to about 0.2 mil thickness, and even thicker if the underneath nickel is not too thick and such porous metal surfaces can hold oil in the pores as a reservoir and can therefore give improved results in sliding friction contacts as with anodized aluminum pistons working against cylinder surfaces or liners than have such a porous chromium surface. A silver plate can be deposited on the two-phase composite copper plate and a porous silver surface would result, and this would be an improved bearing surface because the pores could retain an oil reservoir.

It was found that the Saran powders did not appreciably codeposit from alkaline cyanide copper baths nor from alkaline copper pyrophosphate baths. In the case of acidic nickel plating baths a Saran F–120 powder gave maximum codeposition (U.S. Pat. No. 3,356,467, Dec. 5,1967) on vertical cathodes whereas with the acid copper plating baths, it was Saran F–220 that gave maximum codeposition. Instead of the acid copper sulfate bath, the acid copper fluoborate or acid copper methane sulfonate or acidic copper sulfamate baths can be used for the codeposition of the Saran resin particles.

The resin can also be used to coat particles that would ordinarily cause rough copper plate to be obtained if suspended or dispersed in the acid copper plating baths. For example, metallic powders such as lead, silver, nickel, chromium can be coated by various means with Saran resin films by spraying or immersion in the resin dissolved in solvents such as ketones. In a similar manner graphite and molybdenum sulfide which also cause rough plate can be coated with the Saran resin and then densely codeposited with the copper as a smooth composite plate. Thus, with the coated lead, graphite or molybdenum sulfide powders, a smooth composite copper plate is obtained containing these highly anti-seizing and lubricating particles.

To disperse and distribute the Saran particles in the acid copper plating baths air agitation or mechanical agitation may be used. Too violent mechanical agitation may greatly decrease the extent of codeposition. Usually air agitation is preferred. Surfactants such as sodium 2-ethylhexyl sulfate or sodium n-octyl sulfate or the sulfonates may be used in the air agitated baths. Sometimes it is advisable to wash the Saran resins with isopropyl alcohol to aid their wetting by the bath. The concentration of Saran particles may be from 1 gram/liter to at least 300 grams/liter, though maximum codeposition usually occurs with 50 to 150 grams/liter. The best temperature for the operation of these baths is preferably around room temperature. Temperatures higher than 140° F cause decreased codeposition of the particles. The pH of the acid copper baths is not critical neither is the copper ion concentration, though standard low metal and high metal acid copper plating baths are generally preferred. In Example I an acid copper sulfate plating bath with Saran particles is shown and in Example II a fluoborate bath.

EXAMPLE I

| | Concentration in Grams per Liter |
|---|---|
| $CuSO_4 \cdot 5HO$ | 100–250 |
| $H_2SO_4$ | 25–100 |
| Saran F–220 | 25–150 |
| Temperature 60°F–120°F | Agitation-Air or Mechanical |
| Cathode Current Density | 10 to 100 amps/sq.ft. |

EXAMPLE II

| | Concentration in Grams per Liter |
|---|---|
| $Cu(BF_4)_2$ | 100–300 |
| Saran F–220 | 10–200 |
| pH 0.3 to 1.5 | Temperature 60°F to 120°F |
| Cathode Current Density | 20 to 150 amps/sq.ft. |

The chloride ion content of the acid copper baths should preferably be kept below about 100 mg/liter. The copper metal content can be as low as 30 grams/liter and the acid content as high as 150 grams/liter, and while lower cathode current densities have to be used in these low metal, high acid content baths, the plate distribution is more uniform than with the higher metal content baths. Addition agents to brighten the copper plate may be used in the baths without serious interference with the codeposition of the resin or resin coated particles.

In cases where the acid copper plate is to be deposited on steel, a preliminary nickel or cyanide copper strike is used to get good adhesion. To make foils of the copper containing the codeposited particles, the acid copper plate may be deposited directly on stainless steel or on a passivated nickel plate. Instead of a simple copper plate or foil, the two-phase composite copper plate may be deposited on a nickel plate and a duplex plate or foil may be made. If the two-phase copper plate is treated with solvents such as acetone or methyl ethyl ketone, the Saran resin included in the plate can be dissolved out and a porous copper plate or porous copper surface can be obtained. Alternatively, the thermoplastic particles may be melted out or vaporized out.

In cases where the two-phase composite copper plate is further plated with nickel plate of about 0.1 to 0.5 mil thicknesses followed by chromium plate of 0.01 to 0.1 mil thickness, decorative plate of satin to semi-lustrous plate (if the nickel plate was semi-bright or bright nickel plate) can be obtained of excellent corrosion protection of the metal underlying the copper plate, far better than if the copper did not contain the codeposited non-conducting particles.

The density of imbedded Saran resin particles in the surface of the copper plate obtained with about 25 to 150 grams/liter of the Saran F-220 powder dispersed in the acid copper plating bath reaches a maximum by the end of about 0.3 to 0.5 mil copper plate. The particles are most often agglomerated with small particles mixed in with larger particles of about 40 to 50 micron diameters, and the spacing between particles is most often less than the diameters of the particles, thus giving a surface that consists of about 50 percent resin particles. Thus when such a surface is plated with a subsequent metal such as nickel, silver, lead, lead-tin, the porosity of the over-lay plate is in the neighborhood of 50 percent with thin plate up to about 0.3 to 0.5 mil thickness, and with further thickness of plate up to at least 1 mil, the porosity in the over-lay persists though the individual pore diameters decrease with the thicker plate. The over-lay plates with their high porosities can be used for various purposes, such as for increased adhesion in laminates with plastic or for subsequent metal plates, for oil reservoirs in bearing surfaces, etc.

What is claimed is:

1. A method of electroplating which comprises coelectrodepositing with copper, fine bath-insoluble organic resin particles dispersed in aqueous acidic copper electroplating baths, said resin particles selected from the class consisting of polymers of vinylidene chloride, and copolymers of vinylidene chloride.

2. A method in accordance with claim 1 wherein said organic resin particles are copolymers of vinylidene chloride and acrylonitrile.

3. A method in accordance with claim 1 wherein said acid copper electroplating bath is an acidic copper sulfate bath.

4. A method in accordance with claim 1 wherein said acid copper electroplating bath is an acidic copper fluoborate bath.

5. A method in accordance with claim 1 wherein said resin particles are less than about 50 microns size and present dispersed in the plating bath in concentrations of at least 1 gram per liter.

6. A method in accordance with claim 1 wherein said acidic copper electroplating baths are operated at bath temperatures below about 140° F.

7. An electroplating bath comprising an aqueous acidic copper electroplating bath containing dispersed therein fine organic resin particles, selected from the class consisting of polymers of vinylidene chloride, and copolymers of vinylidene chloride.

8. A bath in accordance with claim 7 wherein said organic resin particles are copolymers of vinylidene chloride and acrylonitrile.

9. A bath in accordance with claim 7 wherein said acid copper electroplating bath is an acidic copper sulfate bath.

10. A bath in accordance with claim 7 wherein said acid copper electroplating bath is an acidic copper fluoborate bath.

11. A bath in accordance with claim 7 wherein said resin particles are less than about 50 microns size and present dispersed in the plating bath in concentrations of at least 1 gram per liter.

12. The method of claim 1 wherein the pH ranges from 0.3 to 1.5.

* * * * *